United States Patent [19]

Eisman et al.

[11] Patent Number: 5,164,060
[45] Date of Patent: Nov. 17, 1992

[54] ION EXCHANGE MEMBRANE HAVING INCREASED EFFICIENCY IN PROTON EXCHANGE PROCESSES

[75] Inventors: Glenn A. Eisman, Midland, Mich.; Robert D. Door, Clute, Tex.

[73] Assignee: The Dow Chemical Company, Midland, Mich.

[21] Appl. No.: 702,259

[22] Filed: May 17, 1991

Related U.S. Application Data

[62] Division of Ser. No. 536,146, Jun. 11, 1990, abandoned.

[51] Int. Cl.⁵ .............................................. C25B 13/08
[52] U.S. Cl. ................................... 204/282; 204/296; 521/27; 429/33
[58] Field of Search ............... 204/296, 282, 283, 252; 429/33; 521/27, 27, 31, 38

[56] References Cited

U.S. PATENT DOCUMENTS

| | | | |
|---|---|---|---|
| 4,272,353 | 6/1981 | Lawrance et al. | 204/283 |
| 4,470,889 | 9/1984 | Ezzell et al. | 204/296 |
| 4,478,695 | 10/1984 | Ezzell et al. | 204/98 |
| 4,734,170 | 3/1988 | Oda et al. | 204/296 |
| 4,749,452 | 6/1988 | LaConti et al. | 204/98 |
| 4,772,364 | 9/1988 | Dempsey et al. | 204/98 |
| 4,810,594 | 3/1989 | Bregoli et al. | 429/13 |
| 4,822,544 | 4/1989 | Coker et al. | 204/296 |

FOREIGN PATENT DOCUMENTS 2026933  7/1979  United Kingdom .

Primary Examiner—John Niebling
Assistant Examiner—Kathryn Gorgos

[57] ABSTRACT

An ion exchange membrane or ion exchange membrane/electrode assembly having increased efficiency in proton exchange processes as the result of membrane hydration processing comprising heating a hermetically sealed membrane or membrane/electrode assembly at elevated temperature and pressure so as to provide increased hydration levels of the membrane.

19 Claims, No Drawings

ION EXCHANGE MEMBRANE HAVING INCREASED EFFICIENCY IN PROTON EXCHANGE PROCESSES

This is a divisional application of copending application, Ser. No. 07/536,146, now abandoned.

BACKGROUND OF THE INVENTION

1. Field of the Invention

This invention relates to ion transporting membranes for use in proton exchange processes

2. Description of the Prior Art

Ion exchange membranes have many ionizable groups in their polymeric structure. In these membranes, one ionic component of these groups is retained by the polymeric matrix of the membrane while another ionic component remains mobile, consisting of a replaceable ion which is electrostatically associated with the ionic component retained by the polymeric matrix. The characteristic ability of the mobile ion to be replaced under appropriate conditions by other ions imparts the ion exchange characteristics of these membranes. Ion exchange membranes can be either cation exchange or anion exchange membranes. Ion exchange membranes are outstanding separators for use in electrochemical cells since these membranes are permeable to one kind of ion while resisting the passage or direct flow of liquids and ions of opposite charge. The membranes can be made self supporting and can also be reinforced so as to produce membranes having high mechanical strength. The thickness of the membranes is preferably as small as possible, for example, from about 0.05 to 1 mm.

The use of ion exchange membranes in the solid polymer electrolyte cells, fuel cells, and water electrolysis cells of the prior art involves the use of a solid polymer sheet ion exchange membrane as the sole electrolyte. The polymer sheet also acts as the cell separator. The present applications use permselective membranes having a thickness of about 0.1-0.5 mm. Prior to use in the cell, the membrane is hydrated in water so as to contain approximately 30% water based upon the dry weight of the cell membrane. The hydration process renders the membrane conductive to hydrogen ions. Electrochemical cells employing solid polymer electrolyte cell membranes usually have a bipolar configuration. In such cells, the electrocatalysts are bonded to each side of the membrane and the resulting solid polymer electrolyte is a structurally stable membrane and electrode assembly.

Fuel cells convert chemical energy directly into electrical energy without going through a heat cycle. The overall conversion to electrical energy is more efficient than in conventional power sources. The many different types of fuel cells can be characterized generally by the medium by which an ionic species migrates from an anodic chamber to a cathodic chamber. Examples of different types of fuel cells are the solid oxide, phosphoric acid, alkaline, molten carbonate and the polymeric membrane.

In fuel cells having a polymeric membrane which is ion permeable, for instance a 5 mil. thick perfluorosulfonic acid membrane having a catalyst coating sandwiched between the bipolar cells, molecular hydrogen enters the anodic compartment and oxygen or air enters the cathodic compartment. Hydrogen is oxidized to produce protons and electrons and the oxygen is reduced. The protons are driven through the thin gas separating membrane by the potential gradients developed at each electrode. The proton reacts with the oxygen or oxide species to form water. The electrons are driven through the circuitry and through the load and then returned to the cathode.

Current commercial applications of fuel cells having polymeric membranes are limited and include military applications and low power hydrogen/air operation. The number of commercial applications is limited by the high cost of the system. It is apparent that improvements in efficiency of fuel cells would increase the number of commercial applications. Typically, fuel cells generate power using catalyst coated membranes in a range of 0.32 to 0.5 kw per square foot of catalyst coated membrane utilized in the cell. Useful fuel cells combine numerous single cells in series so as to increase voltage.

Water electrolysis cells are similar to fuel cells, but instead of operating the cell galvanically, electrical power is added to the cell together with water. The water electrolysis cell is, thus, simply a membrane fuel cell which is operated in reverse. The essential feature of a fuel cell having an ion exchange membrane is the membrane and electrode assembly. The ion exchange membrane is generally a co-polymer of tetrafluoroethylene and a vinyl ether monomer containing a functional group. The membrane is characterized by the ion exchange capacity thereof. This is commonly referred to in terms of the equivalent weight of the ion exchange membrane. The equivalent weight is a property capable of measurement which is related to the ion transporting capability of the ion exchange membrane. In addition to the equivalent weight of the ion exchange membrane, co-polymers of tetrafluoroethylene and a vinyl ether monomer having a functional group attached thereto have generally excellent gas separation characteristics, high ionic conductivity, reasonable mechanical strength, and good handling characteristics.

Although the ion exchange membrane materials of the prior art have been used in fuel cells, their usefulness is reduced because of the low power output and high dependency for efficiency on the membrane and the presence of imbibed water therein. For the greatest usefulness of an ion exchange membrane, the power output in cells containing such membranes should be as high as possible, specifically, being capable of retaining high voltages as the load or current density is increased. Regardless of the increased performance levels upon use of ion exchange membranes, additional voltage gains at a fixed current density would be desirable. In a fuel cell, a proton which is generated by the oxidation of molecular hydrogen is solvated by the water which is added to the fuel cell by a humidification system. The solvated proton is passed through the ion exchange membrane. If the fuel cell humidification system, consisting of water added to the incoming gas stream, is insufficient to solvate the protons, then the source of water for solvation of the proton must become the hydrated membrane itself. The water is available as water which is associated with the sulfonic acid functional groups in the ion exchange membrane. This condition can lead to cell failure if allowed to persist because dehydration of the ion exchange membrane will eventually occur, resulting in increased electrical resistance in the ion exchange membrane, which is manifested by heat build-up.

The use of ion exchange membranes having at least one electrode bonded to a surface of the membrane in electrolysis cells is now well known and such cells are typically illustrated in U.S. Pat. Nos. 4,191,618; 4,212,714, and 4,333,805, assigned to the General Electric Company. In water electrolysis cells and fuel cells, the electrodes are attached by the application of heat and pressure to a membrane in the hydrated form, i.e., the membrane contains the matrix water necessary for the functional groups to dissociate so that the membrane has ion transporting characteristics. The functional groups which permit cation transport may be sulfonates, carboxylates or phosphonates. These functional groups are attached to a polymeric, and preferably, a perfluorinated polymer backbone.

In general, the polymers have found most widespread use in the above applications when the functional group is on a fluorocarbon chain which is pendant to the main polymer backbone. Fluorocarbon sulfonic acid polymers and carboxylic acid polymers have been disclosed in the prior art which have the functional group attached directly to the backbone, but these polymers have found scant utility (U.S. Pat. No. 3,041,317 and British Pat. No. 1,497,748). The polymer materials, whether based upon fluorocarbon sulfonic acids or carboxylic acids, have in general been made by copolymerizing monomers such as tetrafluoroethylene or chlorotrifluoroethylene with fluorocarbon vinyl ethers which contain an acid or an acid precursor functional group (U.S. Pat. No. 3,282,875 and Brit. Pat No. 1,518,387).

The relationship between water absorption of the polymer forming the membrane and usefulness of the polymer as a membrane has long been recognized (W. G. F. Grot, et. al., Perfluorinated Ion Exchange Membranes, 141st National Meeting, The Electrochemical Society, Houston, Tex., May, 1972). Grot disclosed that the capacity of the polymer to absorb water is a function of the equivalent weight of the polymer, the history of pretreatment of the polymer and the electrolytic environment of the polymer. The equivalent weight is the weight of polymer which will neutralize one equivalent of base. It is a measure of the ionic conductivity of the membrane. A standard method of measuring water absorption for meaningful comparisons is given in Grot's paper (above). The method consists of boiling the polymer for 30 minutes in water with the polymer being in the sulfonic acid form. The water absorbed by the polymer under these conditions is called the "Standard Water Absorption". The sulfonic acid based polymer membranes reported on in Grot's paper are composed of the polymers disclosed in U.S. Pat. No. 3,282,875.

One way of correlating functional groups to performance is to measure water of hydration per functional group in the polymer. Comparison of polymers containing carboxylic acid derived functionality (U.S. Pat. No. 4,065,366) and polymers containing sulfonamide derived functionality shows that the carboxylic acid type hydrate less than the sulfonamide type according to C. J. Hora, et al., Nafion R Membranes Structured for High Efficiency Chlor-Alkali Cells, 152nd National Meeting The Electrochemical Society, Atlanta, Ga., October, 1977. Changes in functional group concentration in a given polymer structure results in changes in the hydration water per functional group. Thus, Hora disclosed that a 1500 equivalent weight sulfonic acid polymer of given structure has less water of hydration per functional group and operates at higher current efficiency than an 1100 eq. wt. polymer of the same general structure. In turn, the electrical resistance of the 1500 eq. wt. material is higher than the 1100 eq. wt. material because of the availability of fewer sites to transport ions and thus to conduct current. Sulfonic acid type membranes which are useful in fuel cells are taught in the prior art to have eq. wts. in the range of 1100 to 1200. In practice, eq. wts. of about 1100 are considered best because of lower electrical resistance.

Data for the dehydration of sulfonic acid polymers and sulfonamide polymers has been published by Hora and Maloney in the above publication. In this paper, the polymer structures are the same except for the substitution of sulfonamide groups for sulfonic acid groups. The data shows that, for given eq. wts., the sulfonamides absorb only 35–60% as much water as do the sulfonic acids. A particular case shown is a comparison of 1200 eq. wt. membranes. There, the sulfonic acid membrane absorbs about 20 moles of water per equivalent of sulfonic acid, while the sulfonamide, from methylamine, absorbs 12.3 moles of water per equivalent of sulfonamide and the sulfonamide, from ethylenediamine, absorbs only 8.1 moles of water per equivalent of sulfonamide. From another paper (H. Ukihashi, Ion Exchange Membrane For Chlor-Alkali Process, Abstract No. 247, American Chemical Society Meeting, Philadelphia, Pa., April, 1977) it can be calculated that a carboxylic acid membrane having an eq. wt. of 833 absorbs 8.3 moles of water per equivalent of carboxylic acid and that another having an equivalent weight of 667 absorbs 9.2 moles of water per equivalent of carboxylic acid. Until this invention, substantially greater water absorption of the hydrated membrane than 30–40% by weight, based upon dry weight of the membrane, has not been obtained.

Solid polymer electrolyte catalytic electrodes are used in various devices and processes. For example, they are used in fuel cells, gas generating devices, processes for chemical synthesis, devices for chemical treatment and gas dosimeters and sensing devices and the like. Solid polymer electrolyte catalytic electrode assemblies are currently manufactured by several techniques. U.S. Pat. No. 3,297,484 illustrates in detail materials for electrode structures including exemplary catalyst materials for electrodes, ion exchange resins for solid polymer electrolyte permselective membranes and current collecting terminals. Catalytically active electrodes are prepared in the prior art from finely divided metal powders mixed with a binder, such as polytetrafluorethylene resin. A typical solid polymer electrode assembly comprises a bonded structure formed from a mixture of resin and metal bonded upon each of the two major surfaces of a solid polymer electrolyte permselective membrane. In U.S. Pat. No. 3,297,484, the resin and metal or metal alloy powder mix is formed into an electrode structure by forming a film from an emulsion of the material, or alternatively, the mixture of resin binder and metal or metal alloy powder is mixed dry and shaped, pressed and sintered into a sheet which can be shaped or cut to be used as the electrode. The resin and metal powder mix may also be calendered, pressed, cast or otherwise formed into a sheet, or a fibrous cloth or mat may be impregnated and surface coated with the mixture of binder and metal or metal alloy powder. In U.S. Pat. No. 3,297,484, the described electrodes are used in fuel cells. In U.S. Pat. No. 4,039,409, the bonded electrode structure made from a blend of catalyst and binder is used as the electrode in a gas generation apparatus and process.

In U.S. Pat No. 3,134,697, many ways are described for incorporating catalytically active electrodes into the two major surfaces of a permselective ion exchange resin membrane. In one method, the electrode material made of metal or metal alloy powder and a resin binder may be spread on the surface of an ion exchange membrane or on the press platens used to press the electrode material into the surface of the ion exchange membrane. The assembly of the ion exchange membrane and the electrode or electrode materials is thereafter placed between the press platens and subjected to sufficient pressure, preferably at an elevated temperature, sufficient to cause the resin in either the membrane or in admixture with the electrode material either to complete the polymerization, if the resin is only partially polymerized, or to flow, if the resin contains a thermoplastic binder.

SUMMARY OF THE INVENTION

There is disclosed a novel ion exchange membrane and method of preparing said membrane, which is useful, for instance, in a solid polymer electrolyte membrane and electrode assembly. Substantially higher water of hydration, and, thus, lower ionic resistance is obtained in said membrane. Accordingly, electrochemical cells, such as fuel cells and water electrolysis cells using such assemblies can be operated at higher cell efficiency at a given current. This results from the direct correlation between the ionic resistence of the membrane and the degree of hydration thereof.

In the process of the invention, for the preparation of an ion exchange membrane or a solid polymer electrolyte/electrode assembly, it has been found that increased water of hydration of the membrane can be achieved by heating the membrane or assembly, i.e., the pressing step of a conventional pre-treatment of a membrane, at a temperature substantially above the glass transition temperature of the polymer forming the membrane. During the pressing step, the membrane is hermetically sealed to avoid the escape of moisture. Subsequent to the pressing step at this elevated temperature, the membrane or electrode assembly is exposed to water whereupon an increased water uptake results such that, in comparison with prior art membranes, having 30-40% by weight water uptake, based upon the dry weight of the membrane, the water uptake in membranes and membrane electrode assemblies produced by the process of the invention is approximately 150-300% by weight.

DETAILED DESCRIPTION OF THE INVENTION

The solid polymer electrolyte matrices, membranes or sheets which make up the base member of the electrode assemblies of the present invention, are well known in the art and are not critical in the practice of the present invention. Typical solid polymer electrolyte membranes are described in U.S. Pat. No. 4,478,695, U.S. Pat. No. 4,171,253, U.S. Pat. No. 4,470,889 and U.S. Pat. No. 3,134,697. The solid polymer electrolyte membranes or sheets are composed of ion exchange resins. The resins include in their polymeric structure ionizable radicals, one ionic component of which is fixed or retained by the polymeric matrix with at least one ion component being a mobile replaceable ion electrostatically associated with the fixed component. The ability of the mobile ion to be transported and/or replaced under appropriate conditions with other ions imparts ion exchange characteristics to these materials. The ion exchange resin membranes can be prepared by polymerizing a mixture of ingredients, one of which contains an ionic constituent.

Two broad classes of cation exchange resins are the so-called sulfonic acid cation exchange resins and carboxylic acid cation exchange resins. In the sulfonic acid membranes, the cation ion exchange groups are hydrated sulfonic acid radicals which are attached to the polymer backbone by sulfonation. In the carboxylic acid resins, the ion exchanging group is —COO−. The ion exchange resins may also be in various salt forms such as the sodium salt and the potassium salt.

In the anion exchange resin membranes, the ionic group is basic in nature and may comprise amine groups, quarternary ammonium hydroxides, the guanidine group, and other nitrogen-containing basic groups. In both the cation and anion exchange resin membranes, that is, where the ionic groups are acidic groups (cationic membranes) or where the ionic groups are basic (anionic membranes), the ionizable group is attached to a polymeric compound, typical examples of which are a phenol-formaldehyde resin, a polystyrene-divinyl-benzene copolymer, a urea-formaldehyde resin, a melamine-formaldehyde resin, and the like. The formation of these ion exchange resins into membranes or sheets is also well known in the art. In general, they are of two types, (1) the heterogeneous type, in which granules of ion exchange resin are incorporated into a sheet-like matrix of suitable binder, for example, a binder of polyethylene, polytetrafluoroethylene, or polyvinyl chloride, and (2) the continuous or homogeneous ion exchange resin membrane in which the entire membrane structure has ion exchange characteristics. These membranes are commercially available. A typical example of a commercially available sulfonated perfluorocarbon membrane is the membrane sold by E. I. Dupont de Nemours & Co. under the trade designation NAFION ®. This commercial membrane is more particularly described as is one in which the polymer is a hydrated copolymer of polytetrafluoroethylene (PTFE) and polysulfonyl fluoride vinyl ether containing pendant sulfonic acid groups. The sulfonic groups are chemically bound to the perfluorocarbon backbone through a long side chain and the membrane is hydrated by soaking it in water, preferably at the boil for 10-60 minutes. A membrane having 30% to 35% water of hydration, based upon the dry weight of membrane, is obtained in accordance with the prior art hydration process.

A preferred class of ion exchange membranes having sulfonic acid functional groups in the polymer structure are those described in U.S. Pat. No. 4,478,695 and U.S. Pat. No. 4,470,889, assigned to the Dow Chemical Company, incorporated herein by reference. Polymer structures disclosed in U.S. Pat. No. 4,478,695 have substantially fluorinated backbones which have recurring pendant groups attached thereto and represented by the general formula

where
a=0-3
b=0-3
a+b=at least 1
$R_f$ and $R_g$ are independently selected from the group consisting of a halogen and a substantially fluorinated alkyl group having one or more carbon atoms Y is hydrogen or an alkali Optionally, the polymers of the present invention may also have recurring pendant groups attached thereto represented by the general formula

—OR where R is a straight or a branched substantially fluorinated alkyl chain which may be interrupted by oxygen atoms. Particularly preferred membranes disclosed in U.S. Pat. No. 4,478,695 are hydrolyzed copolymers of tetrafluoroethylene and $FSO_2CF_2CF_2OCF=CF_2$. These preferred materials may also contain pendant groups introduced by the addition to the polymerization of the vinyl ether monomers represented by R-$OCF=CF_2$ where R is preferably

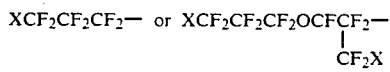

where X = Cl or F.

Membranes disclosed in U.S. Pat. No. 4,470,889 are conveniently made from polymers prepared by copolymerizing at least three monomers where one is a simple fluorocarbon olefin such as tetraflouorethylene or chlorotrifluoroethylene, another is a monomer having potential sulfonate ion exchange functionality such as

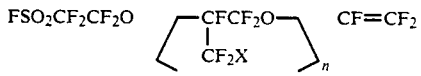

where X = Cl, Br or F and n = 0–3 (U.S. Pat. No. 3,282,875) and still another is a monomer having a halofluoro or perfluoro chain having no ion exchange functionality, attached to the olefin function. When polymers are selected from the above class of polymers that contain a sufficient (greater than 60 mole percent) amount of the simple, non pendant group originating, monomer such as tetrafluoroethylene, tough, easily fabricated films result that give outstanding performance when used as membranes. Particularly preferred polymers are made using the ion exchange functional monomer

as opposed to the functional monomer

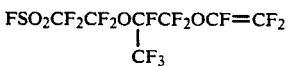

The pendant fluorinated carbon groups having no ion exchange functionality are represented by the general formula

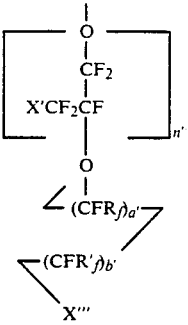

where X' and X''' are independently selected from the group consisting of F, Cl and Br; n', a' and b' are independently zero or an integer greater than zero; and $R_f$ and $R'_f$ are independently selected from the group consisting of fluorine, chlorine, fluoroalkyls and chlorofluoro alkyls. Preferably a'=0–3; b'=0–3; $R_f$=Cl or F and R'=Cl or F; preferably n'=0–3; most preferably n'=0 or 1 and X'=Cl when n'=1; and preferably X''' is Cl.

These materials, on an equivalent weight basis, generally hydrate less, when immersed in water at the boil, in accordance with prior art hydration procedures, than the sulfonated perfluorocarbon membranes sold under the trade designation NAFION. At equivalent weights which are better suited for ion transport, i.e., lower equivalent weights, lower resistance, the membranes described in the '695 and '889 patents hydrate to absorb about 40% to about 50% by weight based upon the dry weight of the membrane. These more suitable membranes would have equivalent weights of about 800 to about 1,000.

The general structure of the NAFION ion exchange membranes is characterized as having the functional sulfonic acid groups at the end of long pendant chains attached to the polymer backbone. The general structure of the sulfonic acid membranes that have received extensive attention for use in chlor-alkali cells and are sold under the trade name NAFION ® by E. I. duPont Company is as follows:

$$-(CF_3CF_2)_x(CFCF_2)_y-$$
$$\begin{array}{c} | \\ O \\ | \\ CF_2 \\ | \\ CF_3-CF \\ | \\ OCF_2CF_2SO_3H \end{array}$$

In contrast, those materials of the latter referenced patents have shorter chain pendant groups for attachment of the sulfonic acid functional groups. It is believed that this structural difference accounts for the absorption of less water of hydration (using prior art methods of hydration) in these ion exchange membranes even when the same concentration of functional groups is present, as indicated by equal equivalent weight, in the polymer, as compared with the NAFION ion exchange membranes. As indicated above, concentration of the functional groups in the ion exchange polymer membrane is measured in the prior art by equivalent weight. This is defined by standard acid-base titration as the formula weight of the polymer having a functional group in the acid form required to neutralize one equivalent of base.

The ion exchange membranes of U.S. Pat. Nos. 4,478,695 and 4,470,889, when compared to the NAFION series, will, on an equal equivalent weight basis, using standard hydration procedures (boiling in water for thirty minutes), hydrate substantially lower. But, in the equivalent weight range most useful, i.e., 800 to 1,000 equivalent weight units, the materials of the two aforementioned patents assigned to the Dow Chemical company, imbibe approximately 40%–50% water. If the longer side chains were available at these equivalent weights, it is believed that as in the higher equivalent weight materials, the shorter side chain materials would still absorb less water on an equal equivalent weight basis.

Regardless of the membrane utilized, it is desirable to increase the hydration levels of the membrane, as already outlined, so as to gain an increase in performance. For the longer side chain materials, hydration levels greater than 30%–35% would be advantageous whereas for the membranes assigned to the Dow Chemical Company, hydration levels greater than 40%–50% would be desirable. This is accomplished by application of this invention.

A typical procedure for the preparation of the membrane or solid polymer electrode assemblies of the invention is as follows. The membrane, prior to use, is first converted from the salt form to the proton form. The salt form (usually the sodium or potassium salt) is thus converted by placing it in a strong acid solution, such as sulfuric acid. The membrane is subsequently washed and boiled. Water of hydration is incorporated into the membrane by heating at 200–230 degrees centigrade preferably by pressing the membrane while it is hermetically sealed. Subsequently, the membrane is exposed to water at room temperature up to boiling. The membrane/electrode assemblies are made by combining the proton form of the membrane with electrode layers which are bonded to the membrane by pressing. Subsequent to the initial boiling step, the ion exchange membrane is cooled and excess water is removed before placing the membrane between electrode elements and pressing the assembly at 200–230 degrees centigrade.

In the prior art, ion exchange/electrode assemblies are pressed at about 177 degrees centigrade at a pressure of 500 lbs. per square inch. In the process of the invention, the temperature of heating preferably obtained during pressing is increased to about 200 degrees centigrade to 230 degrees centigrade and thereafter, the assembly is removed from the press and exposed a second time to water. Surprisingly, it has been found that a significant additional amount of water of hydration is incorporated subsequent to pressing the hermetically sealed membrane/electrode assembly at elevated temperature and exposing the assembly a second time to water. Typically, about 150–300% by wt. more water is incorporated into the above preferred membrane structure (U.S. Pat. No. 4,478,695 and U.S. Pat. No. 4,470,889) by the process of the invention. Utilizing the hydration procedure of the prior art, involving the use of a lower heating temperature than the process of the invention, about 30–50% by wt. water is incorporated into the same membranes. A temperature of up to the decomposition temperature of the polymer can be used as a step in the hydration process of the invention. Critical to the functioning of the process of invention is the heating the hermetically sealed membrane electrode assembly at an elevated temperature, which is at least above the glass transition temperature of the polymer of the membrane but below the thermodegradation temperature of the polymer.

Catalysts for catalytic sensing electrodes, for fuel cell electrodes, for chemical synthesis and for processing electrodes, for gas generation electrodes and the like, are well known in the art and are not critical in the practice of the present invention. One skilled in the art can choose any suitable catalyst material or materials depending upon the end use of the solid polymer electrolytic catalytic electrode. Many catalysts are described in U.S. Pat. Nos. 3,297,484 and 3,369,886 and include metals, metal oxides, metal alloys and other metal compounds, including mixtures of the foregoing selected from the group consisting of metals in groups IV-B, V-B, VI-B, VII-B, VIII, I-B, II-B, III-B, IV-A and V-A of the Periodic Chart of the Elements. Typical examples of the metals, metal oxides, metal alloys and other metal compounds which may be used in accordance with the present invention, and mixtures of the foregoing, include the metals, metal oxides, metal alloys and other metal compounds of titanium, zirconium, vanadium, niobium, chromium, molybdenum, tungsten, maganese, rhenium, ruthenium, osmium, cobalt, rhodium, iridium, nickel, palladium, platinum, copper, silver, gold, zinc, cadmium, yttrium, tin, lead, and the like.

In the preparation of the fuel cell electrodes of the invention, the catalyst materials are deposited or placed upon the surface of the ion exchange membrane in the form of finely-divided particles or powders. The metal, metal oxide, metal alloy and other metal compounds and the like, and mixtures thereof, are well known in the art in their finely-divided or powdered forms.

One typical method of making the finely-divided metals and metal alloys is described in U.S. Pat. No. 3,369,886 where salts of the desired finely-divided metals are dissolved in a suitable solvent, and an aluminum compound is then added to the solution. After the addition of the aluminum compound, such as an aluminate salt, a reducing agent such as formaldehyde, hydrazine, hydroxylamine, methanol, hydrogen, propanol, acetaldehyde, and the like, is added under conditions so that the reduction of the metals and precipitation of the aluminum hydroxide occur simultaneously. The precipitate is treated with a basic solution and then dried. Another method of making a finely divided metal alloy comprises mixing in aqueous solution, the water-soluble salts of at least two metals, and a first reducing agent. These are used in an amount and under conditions insufficient to reduce the metal salts in solution. The aqueous solution of metal salts containing the first reducing agent is added to a caustic solution of a second reducing agent present in an amount and under conditions sufficient to cause the reduction of the dissolved metal salts at elevated temperatures. Thereafter, a precipitate of an alloy of the metals in the metal salts forms in the solution and the precipitate is separated from the solution.

Still another method for producing finely-divided metals, metal alloys, and metal oxides which are useful in the present invention, is known as the Adams process or modified Adams process. This is described in U.S. Pat. Nos. 3,297,484 and 4,039,409 and essentially embraces thermally decomposing mixed metal salts. For example, a thermally decomposable ruthenium halide, such as ruthenium chloride, is added to an appropriate quantity of chloroplatinic acid in the same weight ratio desired in the final alloy. An excess of sodium nitrate is incorporated, and the mixture is fused in a silica dish at 500 degrees C. for three hours. The residue is washed thoroughly to remove soluble nitrates and halide salts leaving a platinum-ruthenium oxide. The resulting suspension of mixed oxides may then be reduced at room temperature by bubbling hydrogen therethrough or by using an electrochemical reduction technique, i.e., electrochemical reduction in acid media. The product, which is a reduced platinum-ruthenium alloy, is dried thoroughly as by the use of a heat lamp, then ground, comminuted or pulverized and then sieved through a suitable screen.

Although particle size of the powder or finely-divided catalytic material used in the solid polymer electrolyte catalytic electrode of the present invention is not critical, a preferred range of particle size is from about 25 to about 1000 Angstrom units. In another preferred embodiment, the finely-divided catalytic particles are those which are sieved through sieves having a size from about 50 mesh to about 80 mesh.

Since the catalytic particles upon the surface of the solid polymer electrolyte membrane must be energized for the passage of current for the electro oxidation or electro reduction of chemicals and elements, for the passage of current through the solid polymer electrolyte membrane, and the like, the catalyst particles or powder must be of the type generally classified as conductive, that is, such catalyst particles or powder must be electrically conductive.

As used herein, finely-divided means any powder form, particulate form, granular form, bead form, or any other form of catalyst material which may be deposited upon a solid polymer electrolyte membrane and fixed thereto. The amount of catalyst material which is deposited upon the surface of the solid polymer electrolyte membranes in accordance with the process of the present invention is not critical.

The catalytic particles must be fixed upon the surface or surfaces of the solid polymer electrolyte membrane base member. Any well known fixing technique of adhering, bonding or otherwise uniting a particulate or powdered material to a surface may be used. In the prior art, bonding is disclosed at temperatures up to 177 degrees centigrade. Particles or powder may be fixed upon the surface of the solid polymer electrolyte membrane by any one or a combination of pressure, heat, adhesive, binder, solvent, electrostatic, and the like. The preferred embodiment for fixing the particles of catalyst upon the surface of the solid polymer electrolyte membrane base member is by a combination of pressure and heat.

In the process of this invention, when heat is used to fix the particles or powder upon surface of the solid polymer electrolyte membrane base member, temperatures of about 180 degrees C. up to less than the decomposition temperature of the membrane are generally used. A preferred temperature range is from about 200 degrees C. to about 230 degrees C. and the most preferred temperature range is from about 210 degrees C. to about 225 degrees C. Generally, pressure and heat are applied simultaneously, the heating device may be incorporated in the pressure device such as the pressure plate or the pressure roller or rollers, or there may be any suitable combination of external sources of heat used in conjunction with pressure devices.

Generally, the length of time for the application of heat is not critical and is dependent upon the temperature and/or pressure being applied to the surface of the solid polymer electrolyte membrane having catalyst particles or powder deposited thereon. Typically, heat is applied from less than about 1 minute to about 2 hours. When a pressure of about 250-750 lbs per square inch is used with a temperature of about 200° C. to about 230° C., heat is applied for less than about 1 minute to about 15 minutes.

If the ion exchange resin in the solid polymer electrolyte membrane is in the potassium form, it must be exchanged by appropriate treatment well known to those skilled in the art for the hydrogen (H+) form. As explained above, the ion exchange resin membrane may be composed of a cation exchange resin or an anion exchange resin depending upon the particular application for the electrode. In any case, it is necessary to hydrate or hydrolyze or otherwise treat the ion exchange resin membrane element of the electrodes made in accordance with the present invention after the catalyst particles or powder have been fixed to the surface. Hydrolysis of these membranes is carried out by initially soaking the membranes in water, preferably at the boil for a period of time. A second soaking of the membrane in water, preferably at the boil, is necessary subsequent to fixing of the catalyst by heat and pressure on the membrane. The process of the invention yields a solid polymer electrolyte/electrode assembly having a water content substantially greater than the water content of solid polymer electrolyte/electrode assemblies prepared in accordance with prior art hydration procedures. Thus, the preferred membrane assembly of the prior art (U.S. Pat. No. 4,478,695 and U.S. Pat. No. 4,470,889) typically has a water of hydration of about 30 to about 50% by weight based upon the dry weight of the membrane, while the solid polymer electrolyte/electrode assembly of the invention has a water content generally of about 150-300% by weight, preferably of about 200-250% by weight, based upon the dry weight of the membrane.

The following examples illustrate the various aspects of the invention but are not intended to limit its scope. Where not otherwise specified throughout this specification and in claims, temperatures are given in degrees centigrade in parts, percentages, and proportions are by weight.

EXAMPLE 1

This example illustrates the hydration of a permselective membrane in accordance with the process of the invention. The membrane used is generally described and disclosed in U.S. Pat. No. 4,470,889 (assigned to the Dow Chemical Company) and is more specifically described as made from polymers prepared by copolymerizing at least two monomers where one is a simple fluorocarbon olefin, such as, tetrafluoroethylene and the other monomer contains a potential sulfonate ion exchange functionality. Polymers are selected from the above class of polymers that contain greater than 60 mole percent of the non-pendant group originating monomer, such as, tetrafluoroethylene. The ion exchange functional monomer is

$FSO_2CF_2CF_2OCF_2=CF_2$.

The membrane had an equivalent weight of 800 and was 5 mils thick.

The membrane is protonated by the following two step procedure:

(1) The membrane is heated in an aqueous 25% sodium hydroxide solution at a temperature of 50-80 degrees centigrade for 15 minutes to 16 hours, in order to convert the membrane to the sodium ion form.

(2) Thereafter, the membrane is washed in water and subsequently immersed in a 25% by weight solution of a strong acid, such as, sulfuric acid at a temperature of ambient to about 50 degrees centigrade in order to convert the membrane to the protonated form.

Thereafter, the membrane is hydrated by washing in deionized water and subsequently heated by pressing at 500 psi at a temperature of about 215 degrees centigrade for a time of about 1 to about 15 minutes and thereafter exposed to water. During pressing, the membrane is hermetically sealed by placing it between two assemblies, each consisting of a sheet of niobium foil, a sheet of Teflon paper and a sheet of silicone rubber. The water uptake upon exposure to water was 172% by weight, based upon the dry weight of the membrane.

EXAMPLE 2—CONTROL, FORMING NO PART OF THIS INVENTION

The procedure of Example 1 is repeated except that the membrane is hydrated by boiling in water for 30 minutes. The water uptake was 50% by weight.

EXAMPLE 3

Example 1 is repeated substituting a permselective membrane sold under the trade designation NAFION 117. This is a polymer containing a fluorocarbon backbone with perfluorinated ether side chains terminated by an $-SO_3-H+$ group. The polymer has an equivalent weight of about 1120 and was 7 mils thick. The water uptake upon exposure to water was 45% by weight.

EXAMPLE 4—CONTROL, FORMING NO PART OF THIS INVENTION

Example 2 is repeated substituting the permselective membrane of Example 3. The water uptake upon exposure to water was 31% by weight.

Each of the hydrated membranes of Examples 1 through 4 were evaluated for ionic conductivity by incorporating the membranes into a YSI model 31 resistance bridge. Prior to testing, the membranes of control Examples 2 and 4 were subjected to the press conditions shown in the following table. The electrode surface area was 1 square centimeter. The reference solution was deionized water. The resistance of the water measured 2380 ohms in this cell. Using the water as a reference, each of the hydrated membranes of Examples 1-4 were tested by sandwiching the membranes between the two cell halves and measuring the resistance. The results are detailed in the following table.

TABLE

Resistance of Hydrated Ion Exchange Membranes

| Example | Press Conditions Temperature (°C.) | Pressure (psi) | Resistance (ohms) |
| --- | --- | --- | --- |
| 1 | 215 | 500 | 560 |
| 2 | 175 | 500 | 185 |
| 3 | 215 | 500 | 1280 |
| 4 | 175 | 500 | 1650 |

EXAMPLE 5

This example illustrates the preparation of a solid polymer electrolyte membrane having a catalyst embedded in the surface of the membrane wherein the electrode/ion exchange membrane assembly is prepared in accordance with the process of the invention. The membrane used in Example 1 is loaded with catalyst by applying catalyst over the area of the solid polymer electrolyte membrane. The catalyst composition is as follows: 85% by weight platinum black and 15% by weight polytetrafluoroethylene. Thereafter, the solid polymer electrolyte ion exchange membrane is placed between two assemblies, each consisting of a sheet of niobium foil, a sheet of Teflon paper, and a sheet of silicone rubber placed in the center of a press, and heated at a temperature of 215 degrees centigrade at a pressure of 500 lbs. per square inch for a period of 8-10 minutes. The press is thereafter cooled to about 50 degrees centigrade and the solid polymer electrolyte permselective membrane, having a catalyst surface embedded on one surface of the membrane, is removed.

EXAMPLE 6—CONTROL FORMING NO PART OF THIS INVENTION

The process of Example 5 is repeated, except that the press temperature was 175 degrees centigrade.

EXAMPLE 7

A dry solid polymer electrolyte permselective membrane supplied by E. I. Dupont de Nemours and Company under the trade designation, NAFION 117 is used to form a solid polymer electrolyte permselective membrane having a catalyst, as disclosed in Example 5, embedded in the surface of the membrane by heating the catalyst and permselective membrane assembly in a press at a temperature to 215 degrees centigrate and a pressure of 500 lbs. per square inch for a period of 8-10 minutes. The membrane is pressed between two assemblies as described in Example 5. Thereafter, the pressure is reduced and the press is cooled to a temperature of about 50 degrees centigrade and the solid polymer electrolyte permselective membrane, having a catalyst embedded in one surface of the membrane, is removed.

EXAMPLE 8—CONTROL, FORMING NO PART OF THIS INVENTION

Example 7 is repeated, except that the electrode/permselective membrane assembly is pressed at a temperature of 175 degrees centigrade at a pressure of 500 lbs. per square inch for a period of about 8-10 minutes. Thereafter, the pressure is relieved and the electrode/permselective membrane assembly is cooled to approximately 50 degrees centigrade before removal from the press.

Each of the electrode/permselective membrane assemblies prepared in Examples 5 through 8 are installed in a fuel cell. In each of the membrane and electrode assemblies prepared in Examples 5 through 8, the membrane and electrode assemblies separate the anode and cathode compartments of the cell. The fuel cells are operated by supplying gaseous hydrogen to the anodic compartment and an oxidant, preferably gaseous oxygen or air, to the cathode. The gaseous hydrogen diffuses through the electrode structure thereby coming in contact with the catalyst layer bonded to the ion exchange membrane surface. The hydrogen is oxidized so as to generate protons and electrons. The oxygen entering the cathode contacts the catalyst layer bonded to the cathodic side of the ion exchange membrane and electrode assembly and is thereby reduced. The potential difference generated at the two electrodes, as a result of the reactions taking place, creates a driving force for the transport of the protons through the ion transporting ion exchange membrane. A proton and a reduced oxygen species combine as they come in contact at the catalyst layer on the ion exchange membrane. The result of this reaction is the generation of a voltage at the terminals of the cathode and the anode. In galvanic cells, such as fuel cells, the higher the voltage, the higher the cell effeciency. In these examples, the cell is supplied with 30 lbs. per square inch gauge of hydrogen and 40 lbs. per square inch gauge of oxygen. The temperature of the fuel cell is 80 degrees centigrade. The open circuit potential (no current flow) is 1.2 volts. When current is drawn from the cell, the potential is reduced as is dictated by thermodynamics.

While this invention has been described with reference to certain specific embodiments, it will be recognized by those skilled in the art, that many variations are possible without departing from the scope and spirit of the invention. It will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A process for making an ion exchange membrane having enhanced performance characteristics upon utilization in a proton exchange electrochemical cell comprising:
   (a) exposing to water said ion exchange membrane in the proton form, thereafter
   (b) heating said membrane at a temperature above the glass transition temperature of the polymer forming said ion exchange membrane and, thereafter
   (c) exposing said membrane to water.

2. An ion exchange membrane made by the method of claim 1 wherein said proton exchange cell is a fuel cell or a water electrolysis cell and wherein the ion exchange membrane is a polymer derived from a monomer represented by the formula:

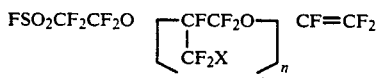

where X=Cl, Br or F and n=0-3 and wherein the polymer has an equivalent weight of about 800 to about 1500.

3. The ion exchange membrane of claim 2, wherein the ion exchange membrane has an equivalent weight of about 800 to about 1300.

4. The ion exchange membrane of claim 2, wherein the ion exchange membrane has an equivalent weight of less than 1000 and the ion exchange membrane is hermetically sealed during heating.

5. The ion exchange membrane of claim 2, the ion exchange membrane has an equivalent weight of less than 1000.

6. The ion exchange membrane of claim 2 wherein n is equal to 1 and X is equal to fluorene.

7. The ion exchange membrane of claim 2 wherein n is equal to 1 and X is equal to chlorine or bromine.

8. The ion exchange membrane of claim 2 wherein n is equal to 0.

9. The process of claim 1 wherein said proton exchange cell is a fuel cell or a water electrolysis cell and wherein the ion exchange membrane is a polymer derived from a monomer represented by the formula:

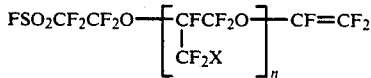

where X=Cl, Br or F and n=0-3 and wherein the polymer has an equivalent weight of about 800 to about 1500.

10. The process of claim 9 wherein n in said polymer is equal to 1 and X is equal to fluorine.

11. The process of claim 9 wherein n is equal to 1 and X is equal to chlorine or bromine.

12. The process of claim 9 wherein n is equal to 0.

13. An ion exchange membrane/electrode assembly wherein said membrane is made by the method of claim 1 wherein the ion exchange membrane is a polymer derived from a monomer represented by the formula

where X=Cl, Br or F and n=0-3 and wherein the polymer has an equivalent weight of about 800 to about 1500.

14. The ion exchange membrane/electrode assembly of claim 13 wherein n is equal to 1 and X is equal to fluorine.

15. The ion exchange membrane/electrode assembly of claim 13 wherein n is equal to 1 and X is equal to chlorine or bromine.

16. The ion exchange membrane/electrode assembly of claim 13 wherein n is equal to 0.

17. The ion exchange membrane/electrode assembly of claim 13 wherein the ion exchange membrane has an equivalent weight of about 800 to about 1300.

18. The ion exchange membrane/electrode assembly of claim 13 wherein the ion exchange membrane has an equivalent weight of less than 1000 and the ion exchange membrane is heremetically sealed during heating.

19. The ion exchange membrane/electrode assembly of claim 13 wherein a=0-2, b=0-2, and the ion exchange membrane has an equivalent weight of less than 1000.

* * * * *